United States Patent
Feng et al.

(10) Patent No.: US 9,616,962 B2
(45) Date of Patent: Apr. 11, 2017

(54) THREE-PIECE STEM OF BICYCLE

(71) Applicant: J.D. Components Co., Ltd., Shou Shui Hsiang, Chang Hua Hsien (TW)

(72) Inventors: Pin-Chien Feng, Chang Hua Hsien (TW); Kuan-Lin Chung, Chang Hua Hsien (TW)

(73) Assignee: J.D. Components Co., Ltd, Chang Hua Hsien (TW)

( * ) Notice: Subject to any disclaimer, the term of this patent is extended or adjusted under 35 U.S.C. 154(b) by 0 days.

(21) Appl. No.: 14/473,668

(22) Filed: Aug. 29, 2014

(65) Prior Publication Data
US 2015/0059518 A1     Mar. 5, 2015

(30) Foreign Application Priority Data

Aug. 29, 2013   (TW) .............................. 102216254 U

(51) Int. Cl.
| | | |
|---|---|---|
| *B62K 21/00* | (2006.01) | |
| *B62K 21/12* | (2006.01) | |
| *B62K 21/20* | (2006.01) | |
| *B62K 21/14* | (2006.01) | |

(52) U.S. Cl.
CPC .............. *B62K 21/12* (2013.01); *B62K 21/20* (2013.01); *B62K 21/00* (2013.01); *B62K 21/14* (2013.01); *Y10T 74/2078* (2015.01)

(58) Field of Classification Search
CPC ........ B62K 21/12; B62K 21/00; B62K 21/14; B62K 21/20
USPC ..................................... 280/279, 280, 281.1
See application file for complete search history.

(56) References Cited

U.S. PATENT DOCUMENTS

| | | | | |
|---|---|---|---|---|
| 7,125,030 B2 * | 10/2006 | D'Aluisio | .............. | B62K 19/36 267/131 |
| 7,407,176 B2 * | 8/2008 | McJunkin | .............. | B62K 21/12 280/279 |
| 7,699,332 B2 * | 4/2010 | Lai | .......................... | B62K 21/16 280/279 |
| 7,703,786 B1 * | 4/2010 | Domahidy | ............... | B62J 11/00 280/276 |
| 8,020,884 B1 * | 9/2011 | Foley | ..................... | B62K 21/12 280/279 |

(Continued)

FOREIGN PATENT DOCUMENTS

| | | |
|---|---|---|
| TW | M267152 | 6/2005 |
| TW | M311643 | 5/2007 |

*Primary Examiner* — Kevin Hurley
*Assistant Examiner* — Marlon A Arce
(74) *Attorney, Agent, or Firm* — Muncy, Geissler, Olds & Lowe, P.C.

(57) ABSTRACT

A three-piece stem of a bicycle includes a stem body, a bottom pipe, and a middle element. A first torus portion and a second torus portion are disposed at two ends of the stem body, respectively. The bottom pipe is disposed in the second torus portion of the stem body. The middle element is disposed between the second torus portion of the stem body and the bottom pipe. A connecting element couples the second torus portion of the stem body, the bottom pipe, and the middle element together, such that the second torus portion of the stem body, the bottom pipe, and the middle element are fixed tightly to a front forked upright pipe collectively, thereby enhancing the ease of assembly and the binding strength upon completion of assembly.

6 Claims, 3 Drawing Sheets

(56) References Cited

U.S. PATENT DOCUMENTS

| | | | | |
|---|---|---|---|---|
| 8,177,249 B2* | 5/2012 | Servet | ................... | B62K 21/16 280/279 |
| 8,307,735 B2* | 11/2012 | Wehage | ................ | B62K 21/16 74/551.3 |
| 8,550,484 B1* | 10/2013 | Draper | .................. | B62K 21/16 280/276 |
| 9,004,245 B2* | 4/2015 | Moore | ................... | B60T 11/16 188/2 D |

* cited by examiner

THREE-PIECE STEM OF BICYCLE

BACKGROUND OF THE INVENTION

1. Technical Field

The present invention relates to bicycles, and more particularly, to a three-piece stem of a bicycle.

2. Description of Related Art

In general, the stem of a conventional bicycle is connected between a handlebar and a front forked upright pipe and adapted to oppose the reaction force generated from the cyclist's tread, control the direction in which the bicycle moves, and maintain the equilibrium of the bicycle. According to the prior art, Taiwan Patent No. 267152 discloses fixing a torus to a front forked upright pipe by a pressing sleeve and a fastening element. Taiwan Patent No. M311643 discloses fixing a stem to a front forked upright pipe by a single washer or two vertically aligned washers.

Nonetheless, the aforesaid two patents not only pose a difficulty in assembly but also fail to provide sufficient binding strength upon completion of assembly, and in consequence the aforesaid components are likely to get loosened from the front forked upright pipe after long use of the conventional bicycle which always vibrates during a ride. As a result, there is still room for improvement of cycling safety.

SUMMARY OF THE INVENTION

It is an objective of the present invention to provide a three-piece stem of a bicycle to enhance the binding strength upon completion of assembly and thus ensure cycling safety.

In order to achieve the above and other objectives, the present invention provides a three-piece stem which comprises a stem body, a bottom pipe, a middle element, and connecting elements. A first torus portion is disposed at one end of the stem body. A second torus portion is disposed at the other end of the stem body. The bottom pipe is disposed in the second torus portion of the stem body. The middle element is disposed between the second torus portion of the stem body and the bottom pipe. The connecting elements connect the second torus portion of the stem body, the bottom pipe, and the middle element. Hence, the three-piece stem of the present invention renders it easy to fix related components to a front forked upright pipe and enhances the binding strength of the overall structure.

Preferably, the middle element, which is an elastic pipe, is fitted to the bottom pipe and adapted to effectuate shock absorption appropriately.

Preferably, the second torus portion of the stem body has a first fixing hole, the bottom pipe has a second fixing hole, the middle element has a third fixing hole, wherein the connecting elements are disposed in the first, second and third fixing holes and adapted to couple the second torus portion of the stem body, the bottom pipe, and the middle element together.

Preferably, the diameter of the third fixing hole substantially equals the diameter of the first fixing hole, and the diameter of the second fixing hole is larger than the diameters of the first and third fixing holes, wherein the connecting elements each have a small diameter portion and a large diameter portion. The small diameter portions of the connecting elements are fitted inside the first and third fixing holes. The large diameter portions of the connecting elements are fitted inside the second fixing holes.

Preferably, the large diameter portion of the connecting elements has a curved surface, and the curvature of the curved surface substantially equals the curvature of the inner surface of the bottom pipe, so as to preclude interference between the front forked upright pipe and the connecting elements.

DETAILED DESCRIPTION OF THE EMBODIMENT OF THE INVENTION

Figure 1:
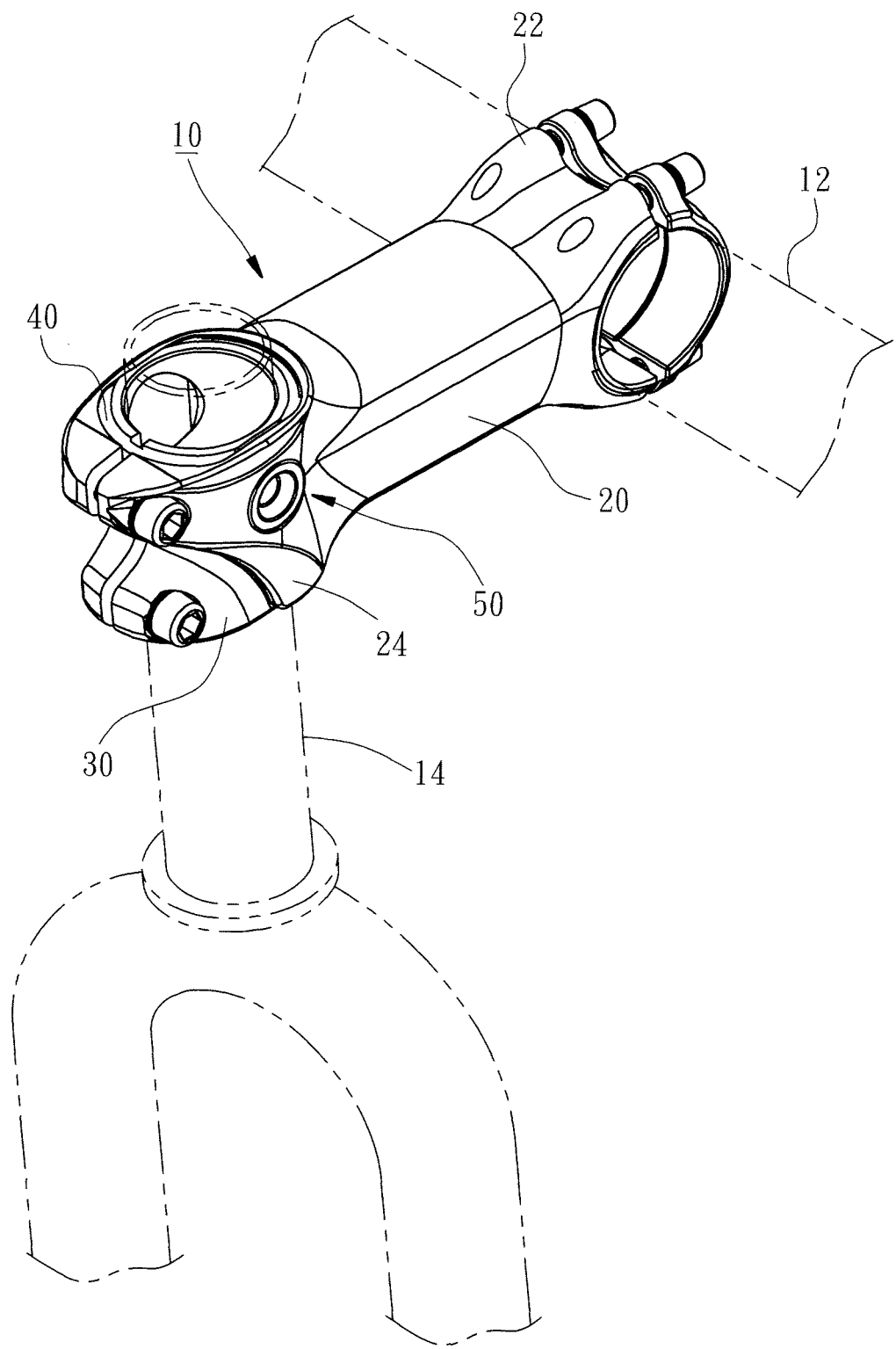
FIG. 1 is a perspective view of the present invention.
Figure 2:
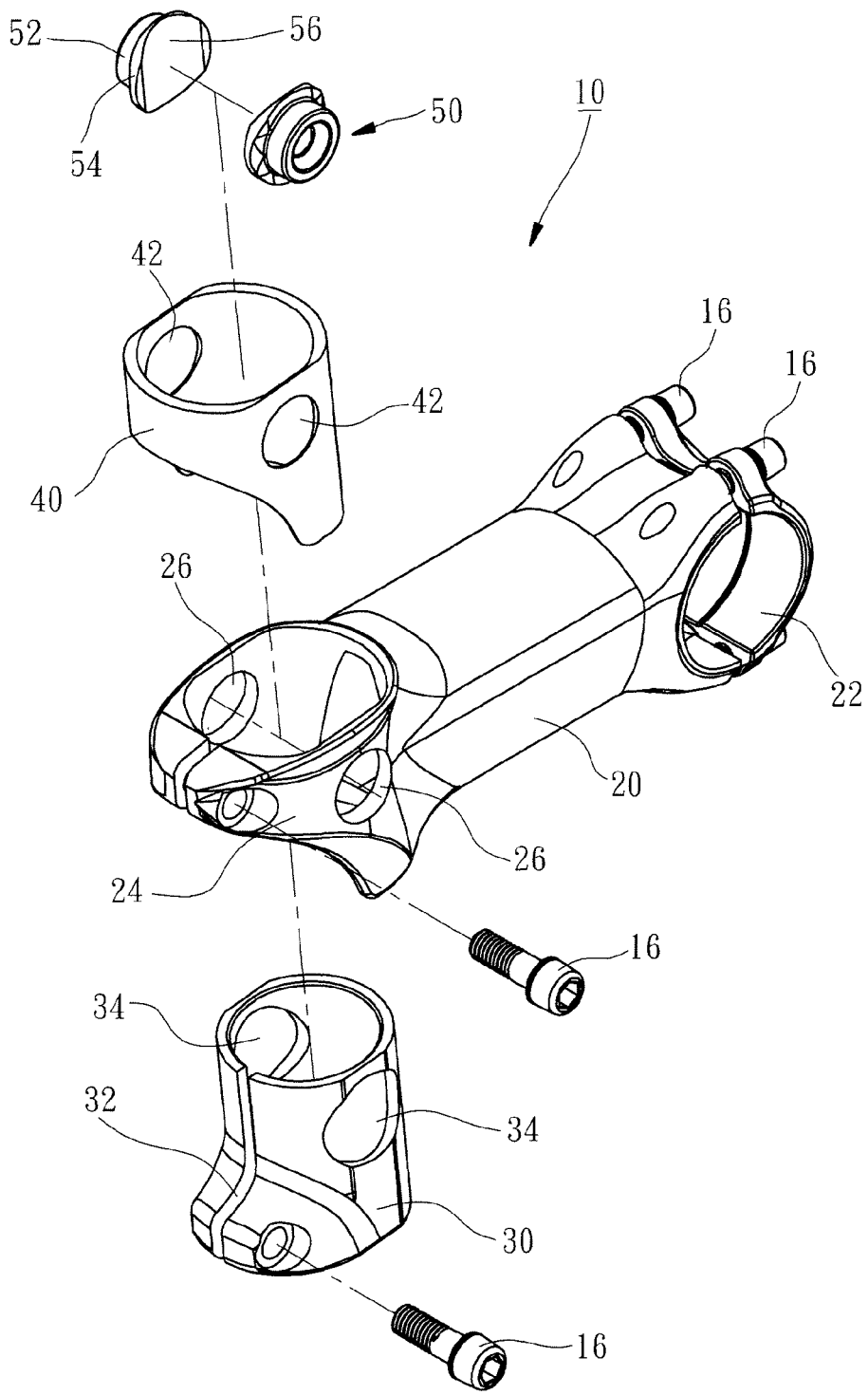
FIG. 2 is an exploded view of the present invention.

Referring to FIG. 1 and FIG. 2, a three-piece stem 10 of the present invention comprises a stem body 20, a bottom pipe 30, a middle element 40, and two connecting elements 50.

A first torus portion 22 is disposed at one end of the stem body 20. The first torus portion 22 is fastened in place by four screws 16 and thus fixed tightly to a handlebar 12. A second torus portion 24 is disposed at the other end of the stem body 20. The second torus portion 24 is fastened in place by a single screw 16 and thus fixed tightly to a front forked upright pipe 14. Furthermore, the second torus portion 24 of the stem body 20 has two opposing first fixing holes 26 (in practice, the present invention will work, provided that at least one said first fixing hole 26 is available.)

The bottom pipe 30 is fitted inside the second torus portion 24 of the stem body 20 and has a slit 32; hence, the bottom pipe 30 is fastened in place by a single screw 16 and thus fixed tightly to the front forked upright pipe 14. Furthermore, the bottom pipe 30 has two opposing second fixing holes 34 (in practice, the present invention will work, provided that at least one said second fixing hole 34 is available.) The diameter of the second fixing holes 34 is larger than the diameter of the first fixing holes 26.

The middle element 40 is preferably an elastic pipe made of plastic, rubber, or any other elastic material, but the present invention is not limited thereto. The middle element 40 is fitted inside the second torus portion 24 of the stem body 20 and fitted to the bottom pipe 30, such that the middle element 40 is disposed between the second torus portion 24 of the stem body 20 and the bottom pipe 30. The middle element 40 has two opposing third fixing holes 42 (in practice, the present invention will work, provided that at least one said third fixing hole 42 is available.) The diameter of the third fixing holes 42 substantially equals the diameter of the first fixing holes 26.

The connecting elements 50 each have a small diameter portion 52 and a large diameter portion 54. The small diameter portions 52 of the connecting elements 50 are fitted inside the first and third fixing holes 26, 42. The large diameter portions 54 of the connecting elements 50 are fitted inside second fixing holes 34. In practice, the present invention will work, provided that at least one of the connecting elements 50 matches the fixing holes 26, 34, 42 in quantity.

Figure 3:
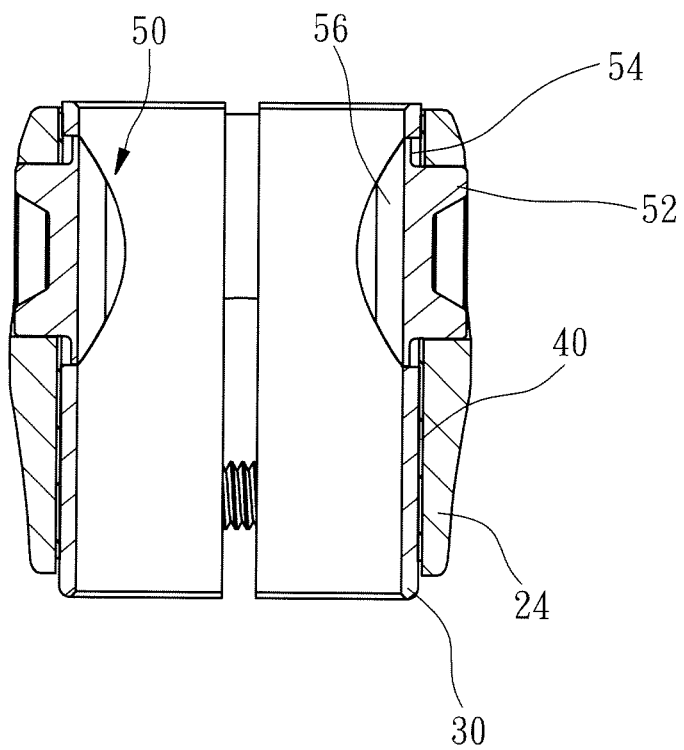
FIG. 3 is a partial cross-sectional view of the present invention.

Referring to FIG. 2 and FIG. 3, an assembly process entails fitting the middle element 40 to the bottom pipe 30, fitting the middle element 40 and the bottom pipe 30 inside the second torus portion 24 of the stem body 20 in a manner that the first fixing holes 26 of the stem body 20, the second fixing holes 34 of the bottom pipe 30, and the third fixing holes 42 of the middle element 40 are in communication with each other, fitting the small diameter portions 52 of the connecting elements 50 inside the first and third fixing holes 26, 42, fitting the large diameter portions 54 of the connecting elements 50 inside the second fixing holes 34, thereby coupling the stem body 20, the bottom pipe 30, and the middle element 40 together, and then fixing the stem body 20, the bottom pipe 30, and the middle element 40 to the top end of the front forked upright pipe 14 collectively. Furthermore, the large diameter portions 54 of the connecting elements 50 have a curved surface 56 each. The curvature of the curved surface 56 substantially equals the curvature of the inner surface of the bottom pipe 30. Therefore, after the stem body 20, the bottom pipe 30, and the middle element 40 have been fixed to the front forked upright pipe 14, there is no interference between the front forked upright pipe 14 and the connecting elements 50, but the connecting elements 50 are restrained by the front forked upright pipe 14 and thus confined to the first, second, and third fixing holes 26, 34, 42, thereby preventing the connecting elements 50 from disconnection.

In conclusion, the three-piece stem 10 of the present invention is conducive to enhancement of the ease of assembly, enhancement of the binding strength and stability of the overall structure upon completion of assembly, and prevention of the loosening of related components from the front forked upright pipe 14 after long use of the bicycle which always vibrates during a ride, thereby ensuring cycling safety. Furthermore, the three-piece stem 10 of the present invention is advantageously characterized in that the middle element 40 is shock-absorbing and thus provides a buffer to the action force conveyed from the front forked upright pipe 14, thereby enhancing riding comfort.

What is claimed is:

1. A three-piece stem of a bicycle, the bicycle having a front forked upright pipe and a head tube sleeved onto the front forked upright pipe, comprising:

a stem body having a first torus portion and a second torus portion opposing the first torus portion;
   a bottom pipe disposed in the second torus portion of the stem body and adapted to be sleeved onto a top end of the front forked upright pipe;
   a middle element disposed between the second torus portion of the stem body and the bottom pipe; and
   at least a connecting element for connecting the second torus portion of the stem body, the bottom pipe, and the middle element.

2. The three-piece stem of claim 1, wherein the middle element is an elastic pipe and is fitted to the bottom pipe.

3. The three-piece stem of claim 1, wherein the second torus portion of the stem body has at least a first fixing hole, the bottom pipe has at least a second fixing hole, and the middle element has at least a third fixing hole, wherein the connecting elements are disposed in the first, second and third fixing holes.

4. The three-piece stem of claim 3, wherein a diameter of the third fixing hole substantially equals a diameter of the first fixing hole, wherein a diameter of the second fixing hole is larger than the diameters of the first and third fixing holes, wherein the connecting elements each have a small diameter portion and a large diameter portion, the small diameter portions being fitted inside the first and third fixing holes, and the large diameter portions being fitted inside the second fixing holes.

5. The three-piece stem of claim 4, wherein the large diameter portions of the connecting elements have a curved surface each, and a curvature of the curved surface substantially equals a curvature of an inner surface of the bottom pipe.

6. The three-piece stem of claim 1, wherein the second torus, the middle element and the bottom pipe are adapted to be mounted concentrically on the front forked upright pipe of the bicycle.

* * * * *